Dec. 27, 1960  W. H. NOWOTNY  2,966,576
WELDING AND WORK TOOL MOUNTING APPARATUS
Filed July 30, 1957  5 Sheets-Sheet 1

WILLIAM H. NOWOTNY
INVENTOR
HUEBNER, BEEHLER & WORREL
ATTORNEYS
BY

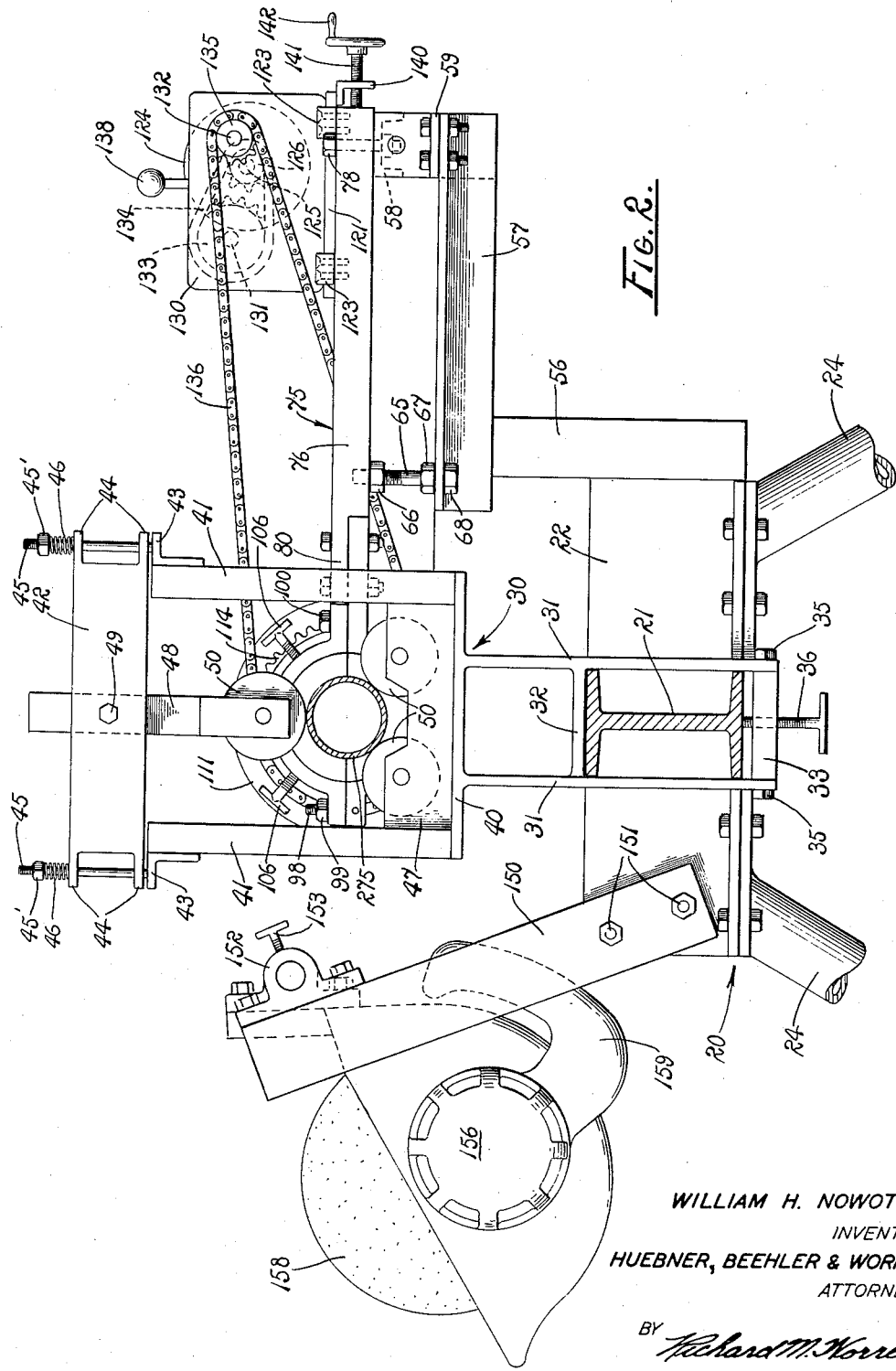

Dec. 27, 1960 W. H. NOWOTNY 2,966,576
WELDING AND WORK TOOL MOUNTING APPARATUS
Filed July 30, 1957 5 Sheets-Sheet 3
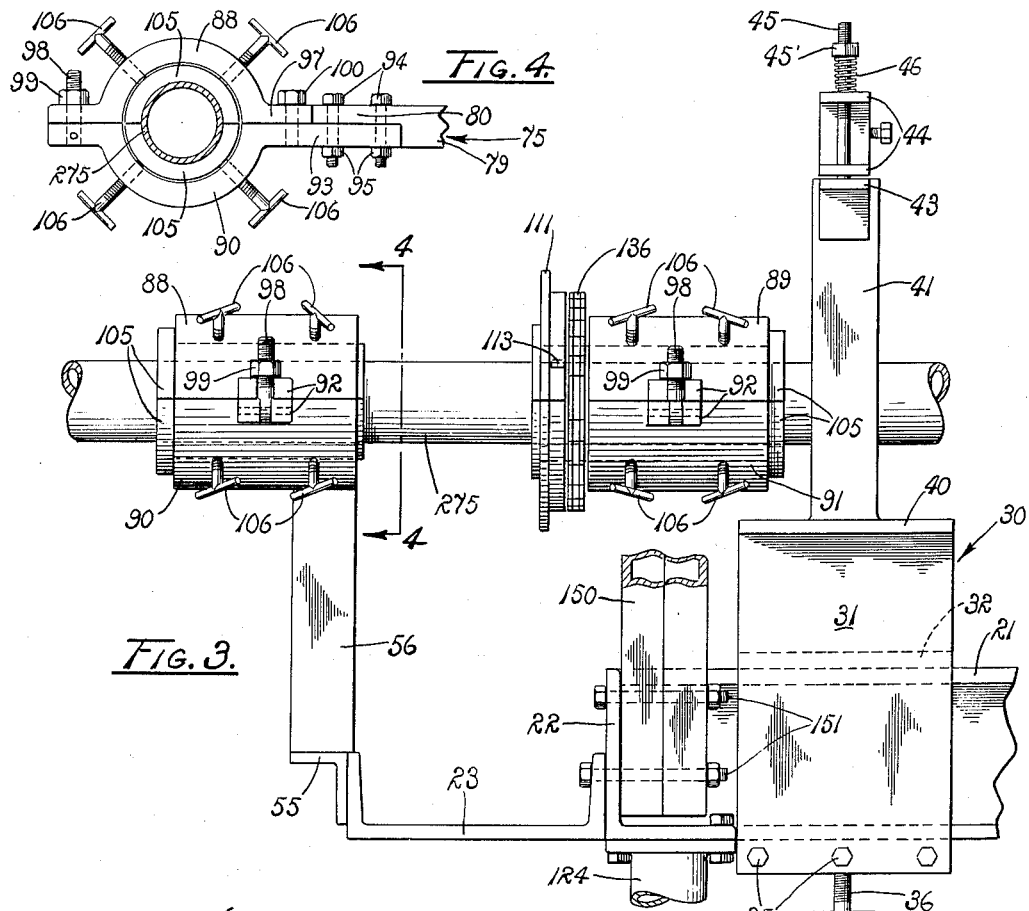
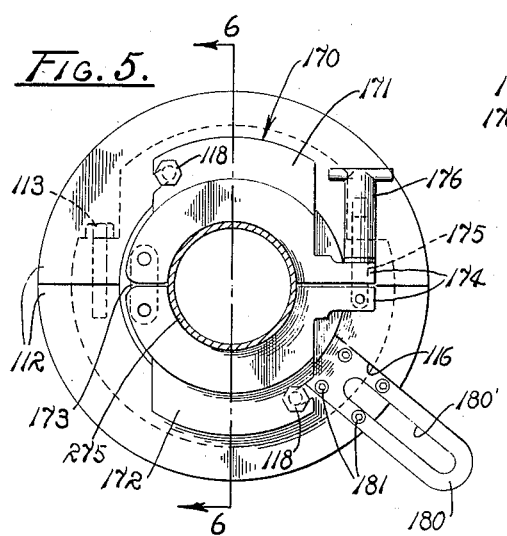
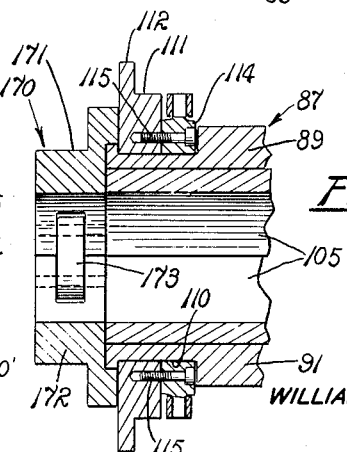
WILLIAM H. NOWOTNY
INVENTOR
HUEBNER, BEEHLER & WORREL
ATTORNEYS
BY Richard M. Worrel Dec. 27, 1960 W. H. NOWOTNY 2,966,576
WELDING AND WORK TOOL MOUNTING APPARATUS
Filed July 30, 1957 5 Sheets-Sheet 4

WILLIAM H. NOWOTNY
INVENTOR

HUEBNER, BEEHLER & WORREL
ATTORNEYS

BY *Richard M. Worrel*

Dec. 27, 1960    W. H. NOWOTNY    2,966,576
WELDING AND WORK TOOL MOUNTING APPARATUS
Filed July 30, 1957    5 Sheets-Sheet 5

WILLIAM H. NOWOTNY
INVENTOR
HUEBNER, BEEHLER & WORREL
ATTORNEYS
BY Richard M. Worrel United States Patent Office 2,966,576
Patented Dec. 27, 1960

2,966,576

WELDING AND WORK TOOL MOUNTING APPARATUS

William H. Nowotny, 1842½ E. McKinley Ave., Fresno, Calif.

Filed July 30, 1957, Ser. No. 675,175

16 Claims. (Cl. 219—125)

The present invention relates to a work tool mounting apparatus and more particularly to an automatic welding and cutting apparatus adapted to be mounted in predetermined relation to a workpiece to be welded or cut. Utility of the present invention is conveniently illustrated by reference to particularly severe welding requirements encountered in the construction and repair of certain fluid food treating devices.

In the processing of certain fluids, such as milk, there is usually provided a system of pipes or conduits for conducting the milk from place to place. Because of space requirements, connections to be made, and equipment locations, the piping system is generally made up of several straight and curved sections in end-to-end relation and welded together to form, in effect, one continuous conduit between points of discharge and/or delivery. Particularly where food products are conveyed, these welds must be perfectly smooth internally of the conduit to avoid bacteria collection. The conduits in such devices are frequently of stainless steel and present difficult welding requirements. In creameries, for example, where releasable couplings are used instead of welds, they must ordinarily be disconnected every twenty-four hours to be cleaned.

It has been determined through experience that continuous smooth welds circumferentially of a pair of pipes are almost, if not entirely, unattainable by hand welding even by the most experienced welders. Invariably, hand welds have flaws which render pipe joined thereby unsuitable for the purposes described.

However, it has been known to provide apparatus adapted to rotate pipes held in end-to-end relation adjacent to a welding electrode to yield a continuous weld circumferentially of the pipes. The pipe rotating apparatus, as it is hereinafter referred to, performs satisfactorily for bench welding but is obviously inoperable for welding pipe in situ, that is, for welding the adjacent ends of two pipes having opposite ends already rigidly connected in a stationary piping system. In most pipe systems, a large percentage of the welding can be done on a bench where the pipe can be rotated. However, there always are a few final joints which must be welded in their place of permanent installation. Even with the former, it is frequently cumbersome and inconvenient to rotate long sections of pipe having one or more angles in it.

Accordingly, it is an object of the present invention to provide an automatic welding apparatus.

Another object is to mount a work tool for circuitous travel in a path of revolution circumferentially of a workpiece.

Another object is to provide a continuous weld between the adjacent edges of a pair of pipes in end-to-end relation.

Another object is to provide an apparatus for mounting a welling electrode for movement circumferentially of a pair of pipes disposed in end-to-end relation so as to enable welding the adjacent ends of the pipes.

Another object is to minimize flaws in the welds of pipes, and particularly those adapted for conducting food products such as milk, so as to avoid bacterial accumulation.

Another object is to exhaust the air and to introduce a shielding gas into the interior of pipes in end-to-end relation and which are to be welded externally of the pipes along their adjacent edges.

Another object is to provide an apparatus of the nature described which is alternatively adapted to rotate an elongated pipe and to mount a saw for engagement with such pipe while rotating so as to cut the pipe.

Another object is to provide a lightweight welding apparatus adapted to be supported on a pair of relatively stationary pipes, to hold the pipes in coaxial relation, and to provide a continuous weld between the adjacent edges of the pipes.

Other objects are to provide a work tool mounting apparatus which is economical to build and operate, easy to adjust, durable in construction, dependable in operation, adapted for use with a variety of work tools and workpieces, and which is highly effective for accomplishing its intended purposes.

These, together with other objects, will become more fully apparent upon reference to the following description and accompanying drawings.

In the drawings:

Fig. 2 is a fragmentary transverse vertical section taken on l'ne 2—2 of Fig. 1.

Fig. 3 is a fragmentary longitudinal vertical section taken on line 3—3 of Fig. 1.

Fig. 4 is a fragmentary transverse vertical section taken on line 4—4 of Fig. 3.

Fig. 5 is a somewhat enlarged transverse vertical section taken on line 5—5 of Fig. 1.

Fig. 6 is a fragmentary longitudinal vertical section taken on line 6—6 of Fig. 5 but with the pipe removed.

Figure 1:
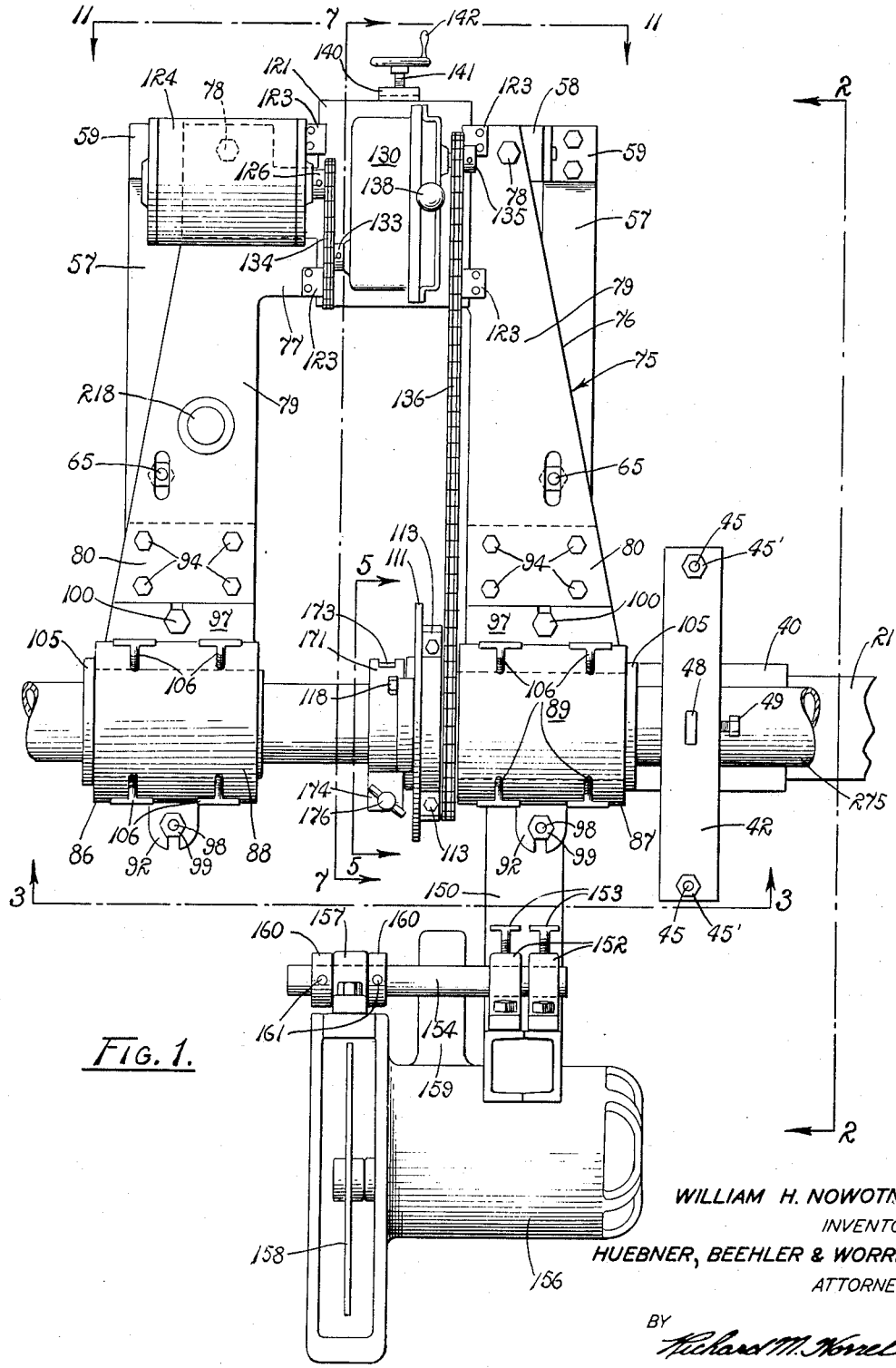
Fig. 1 is a fragmentary top plan view of the work tool mounting apparatus of the present invention showing a pipe mounted in a work position to be cut.

Referring more particularly to the drawings, the work tool mounting apparatus of the present invention is shown particularly in Figs. 2 and 3 as including an upright stand or bench 20 providing an elongated longitudinally extended I-beam 21 in a horizontal position, a horizontal transversely extended angle beam 22 at one end of the I-beam, an upwardly disposed horizontal channel 23 having one flange connected to the angle beam and also extended transversely of the I-beam, and a plurality of legs 24 having upright ends connected to the angle beam and lower ends adapted for engagement with a support surface, not shown. Although not shown, similar legs, transverse beams and channels may be provided at the opposite end of the I-beam.

A carriage 30 includes a pair of vertically disposed lateral plates 31 in slidable engagement on opposite sides of the I-beam 21, top and bottom flanges 32 and 33 rigidly interconnecting the lateral plates in slidable engagement above and below the upper and lower flanges of the I-beam 21. The bottom flange is connected to the downwardly extended ends of the lateral plates by means of bolts 35. An adjustment screw 36 is upwardly screw-threadably extended through the adjustment plate for releasable engagement with the lower flange of the I-beam thereby to position the carriage selectively along the I-beam. A plate 40 is secured to the upper ends of the lateral plates 31 in a horizontal position, and a pair of spaced parallel posts 41 are upwardly extended from the horizontal plate. A cross arm 42 is secured to the upper ends of the posts and provides opposite ends in engagement with angle brackets 43 secured to the outer sides of the posts. The cross arm provides vertically spaced lugs 44 outwardly extended at opposite ends thereof. Elongated vertical bolts 45 have lower ends rigidly secured to the brackets 43 and are slidably extended upwardly through the lugs. Nuts 45' are screw-threadably connected to upper ends of the bolts, and compression springs 46 circumscribe the bolts between their heads and the uppermost lugs 44 for yieldably resiliently resisting upward movement of the cross arm. A mounting panel 47 is connected to the horizontal plate 40 between the posts 41, and an elongated lever 48 is connected by means of a pin 49 intermediate the ends of the cross arm. Three rollers 50 are individually rotatably connected to the lower end of the lever and the opposite ends of the panel in triangular relationship and so that their individual axes of rotation are substantially equally radially spaced from a common center point.

Figure 11:
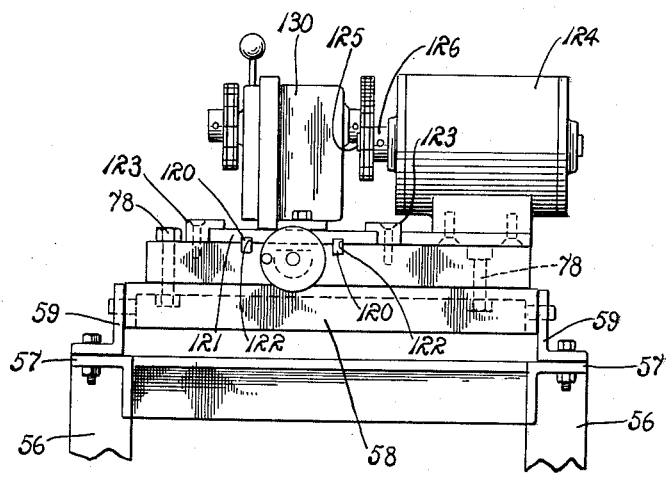
Fig. 11 is a fragmentary side elevation taken at a position indicated by line 11—11 in Fig. 1.

Referring to Fig. 3 and Fig. 11, an angle iron 55 is connected to the channel 23 and is extended transversely of the stand 20. A vertical column 56 is secured to the outer end of the angle iron and upwardly extended therefrom. Likewise, a similar column is secured to an outwardly extended end of the angle beam 22 in longitudinally spaced parallel relation to the other column. Angulated braces 57 are connected to the upper ends of the columns and extend further laterally outwardly of the stand. With particular reference to Fig. 11, an elongated beam 58 provides opposite ends supported by angle brackets 59 on the outwardly extended ends of the braces and extends transversely of the latter in parallel relation to the I-beam 21.

Referring to Fig. 2, adjustable support bolts 65 are extended upwardly through the horizontal flanges of the braces 57 in their inwardly disposed ends and provide upwardly extended ends. Nuts 66 are screw-threaded on the upper ends of the bolts, and lower lock nuts 67 are screw-threaded on the lower ends of the bolts above the support beams on the opposite side of bolt heads 68 to enable vertical adjustment of the support bolts.

As best seen in Figs. 1, 2 and 3, a substantially U-shaped mounting bracket 75 includes a web 76 having a central mounting platform or portion 77 secured in horizontal position on the transverse support beam 58 by means of bolts 78. The web further includes a pair of elongated substantially flat horizontal legs 79 secured to opposite ends of the central portion and extended inwardly toward the stand 20. The legs provide slots receiving the bolts 65 and terminate in inner upper flanges 80.

The bracket 75 also provides a pair of axially aligned, annular, cylindrical clamps 86 and 87 secured to the inner ends of the legs 79. The clamps provide separable upper and lower sections 88, 89, 90 and 91 providing radially extended latching flanges 92 of equal length on one side of the clamps. The lower sections of the clamps provide lower flanges 93 fitted in overlapping relation with the upper flanges 80 of the legs and connected thereto by means of bolts 94 and nuts 95. The upper sections of the clamps have upper flanges 97 overlaying the lower flanges and in abutment with the upper flanges of the legs. Latching bolts 98 are pivotally connected to the lower latching flanges and are received in slots of the upper latching flanges. Nuts 99 are screw-threaded on the latching bolts and are adapted to be releasably tightened down against the upper latching flanges for holding the clamp sections together. The clamp sections provide inner cylindrical bores when they are joined in the described manner. Bolts 100 are upwardly extended from the lower flanges 93 and are fitted in notches in the abutting edges of the upper flanges 97.

A pair of semi-cylindrical adapter segments 105, preferably or brass or copper, are fitted within the upper and lower sections 88, 89, 90 and 91 of the clamps 86 and 87. The adapter segments, when interfitted, form a cylinder having an outside diameter somewhat less than the inside diameter of the bores of the clamp sections when interconnected. Four adjustment bolts 106 are radially screw-threadably extended through the clamps in substantially equally spaced relation circumferentially of the clamps with pairs of the bolts being in diametrical relationship. It will be evident by adjusting the bolts 106, the positions of the adapter segments can be varied thereby to increase or decrease the internal diameter of the bore formed by the segments as well as to shift the axis of such bore.

Figures 8, 9:
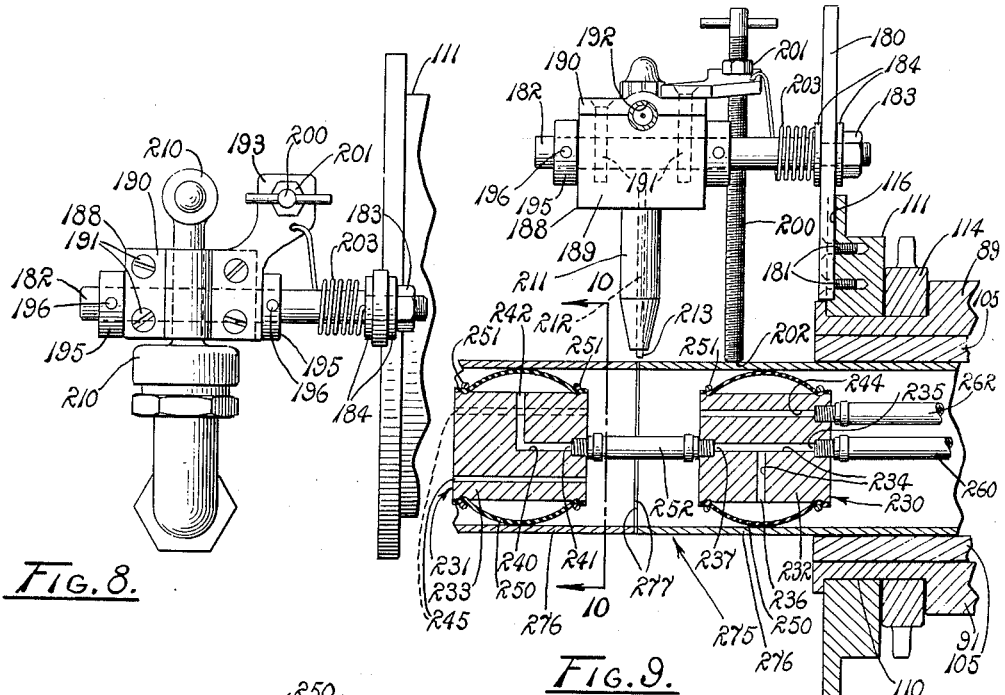
Fig. 8 is a somewhat enlarged fragmentary top plan view looking down on the apparatus of Fig. 7 above the area where the welding electrode is positioned but with the pipe removed.
Fig. 9 is a somewhat enlarged fragmentary longitudinal section of the apparatus of Fig. 7 taken through a pair of pipes to be welded together showing the mounting and positioning of the welding electrode as well as a device for exhausting air from the space within the pipes adjacent to the welding line and for supplying shielding gas to such area.

The clamp 87 provides an annular bearing recess 110 disposed axially inwardly toward the clamp 86 and in circumscribing relation to the axis of the clamp. An annular split collar 111 provides a pair of sections 112 releasably fitted in the bearing recess and interconnected by bolts 113. The collar is rotatably mounted in the recess for rotation relative to the clamp 87 and includes ad riven gear 114. The gear may be formed as a part of the collar or may be secured thereto in sections by means of bolts 115. With reference to Figs. 5 and 9, it is noted that the collar provides a radially disposed channel 116 for a purpose to be described. Further, a pair of studs 118 extend outwardly from the collar sections substantially diametrically of the collar.

As best shown in Fig. 11, a pair of spaced parallel tracks 120 are upwardly extended from the upper surface of the central portion 77 of the web 76 and are in substantially normal relation to the axis of the clamps 86 and 87. A T-shaped panel 121 provides lower grooves 112 slidably receiving the tracks for movement inwardly and outwardly relative to the clamps. Angulated guides 123 are bolted to the central portion of the web in slidable overlapping relation to the side edges of the panel further to guide its inward and outward movement on the tracks. The panel provides a laterally extended portion on which is bolted a motor 124 having a horizontal output shaft 125. A sprocket 126 is secured to the shaft of the motor.

A gear reducing mechanism 130 is also bolted to the panel 121 and provides an input shaft 131 in adjacent spaced parallel relation to the output shaft 125 of the motor 124 and a drive shaft 132 outwardly extended in parallel relation to the axis of the clamps 86 and 87. A sprocket 133 is secured to the input shaft, and a coupling chain is extended around the sprocket on the motor shaft and the sprocket on the input shaft. A drive sprocket 135 is connected to the drive shaft in a coplanar relation with the plane of the gear 114 of the collar 111. An elongated drive chain 136 is extended around the drive sprocket and the driven gear for effecting rotation of the collar incident to operation of the motor. A gear shift 138 is provided on the gear reducing mechanism for changing the gear ratio and thus the relative speeds of the motor shaft and the drive shaft.

As best illustrated in Figs. 1, 2, and 11, a tab 140 is downwardly extended from the rear edge of the panel 121, and an elongated screw 141 is screw-threadably mounted in the tab in parallel relation to the tracks 120 and has an inner end engaging the beam 58. A crank 142 is secured to the screw for enabling rotation thereof and thus to effect inward and outward movement of the panel relative to the clamps 86 and 87. Inasmuch as the motor 124 and gear reducing mechanism 130 are supported on the panel, rotation of the screw also moves these elements toward or away from the clamps. This enables loosening or tightening of the drive chain 136, as will be evident.

Referring to Figs. 1 and 2, in particular, a mounting bar 150 is secured by bolts 151 to the outwardly extended end of the angle beam 22 on the opposite side of the I-beam 21 from the bracket 75 and is outwardly upwardly extended. A pair of clamps 152 is mounted on the upper end of the bar and includes adjustment bolts 153. An elongated rod 154 is longitudinally slidably fitted in the clamps in parallel relationship to the axis of the clamps 86 and 87 of the bracket 75. The bolts, of course, hold the rod in selected adjusted positions. A circular saw 156 includes an annular mounting portion 157 rotatably fitted on the rod for longitudinal slidable movement therealong. The saw includes a circular abrasive disc 158, adapted for pipe cutting upon rotation, and a handle 159 for manipulating the saw. The saw disc is positioned in a plane normal to the axis of the clamps 86 and 87 but the plane of the disc can be adjusted longitudinally of the clamp axes on the rod 154, as will be evident. Annular limit members 160 are fitted on the rod on opposite sides of the mounting portion 157, and setscrews 161 are extended through the limit members for releasable engagement with the rod. In this manner the saw is held in selected axially fixed positions on the rod.

Referring to Figs. 1, 5 and 6, a split clamping ring 170 is shown including a pair of semi-circular jaws 171 and 172 pivotally interconnected by a hinge 173. The jaws are movable between a closed position in cylinder forming relation, as illustrated in Fig. 5, and an outwardly open position. The jaws have extended latching lugs 174 adapted to meet in said closed position. An elongated latching bolt 175 is pivotally connected to one of the lugs and received in a slot of the other lug. A nut 176 is connected to the bolt 175 for tightening against the upper lug thereby to hold the jaws tightly together. The jaws have oppositely directed slots 177 adapted to receive the studs 118 on the collar 111 for rotatable releasable connection of the clamp ring to the collar for rotation therewith.

Figure 7:
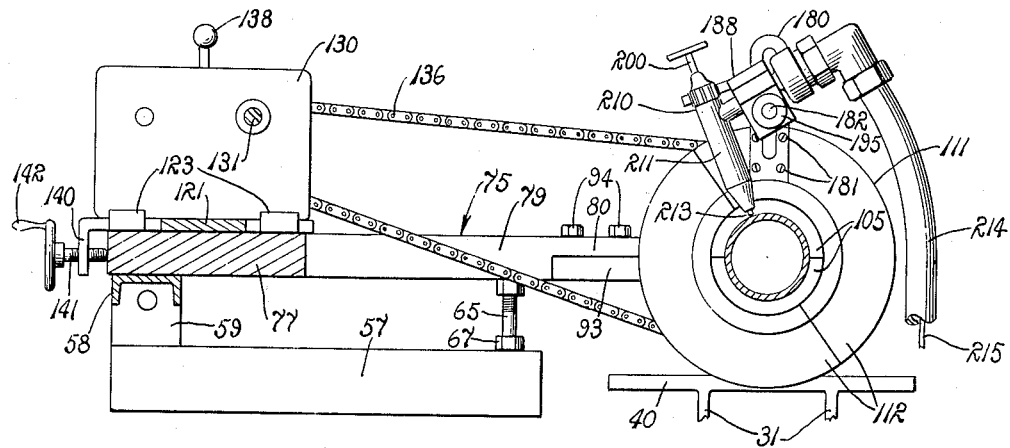
Fig. 7 is a transverse vertical section taken at a position indicated by line 7—7 of Fig. 1 but showing the apparatus as adapted for use in welding a pair of pipes together.

As best seen in Figs. 7, 8 and 9, a mounting arm 180 is connected by bolts 181 in the radial channel 116 of the collar 111 and upwardly extended therefrom. An elongated pivot rod 182 is longitudinally slidably extended through an elongated longitudinally disposed slot 180' in the arm and is secured to the mounting arm by means of a nut 183 screw-threaded on a diametrically reduced end of the rod. Washers 184 larger than the slot are fitted on the rod on opposite sides of the arm. The rod extends right angularly outwardly of the mounting arm in laterally spaced parallel relation to the axis of the clamps 86 and 87.

An electrode mounting block 188 includes a bottom portion 189 and a mating top portion 190 fitted together on opposite sides of the rod and connected by means of bolts 191. The block is rotatably and longitudinally movable on the rod and includes a socket 192 is transversely disposed, laterally spaced relation to the rod. A flange 193 is connected to the block and laterally outwardly extended therefrom generally radially of the rod. A pair of annular stops 195 is fitted on the rod on opposite sides of the mounting block, and setscrews 196 are extended through the stops for releasable engagement with the rod. Thus, the mounting block may be selectively longitudinally adjustably positioned with respect to the clamp axis.

An elongated electrode positioning or spacing finger 200 is screw-threadably mounted perpendicularly in the flange 193 for longitudinal adjustment in relation thereto. A lock nut 201 is provided on the finger for dependably holding it in selected positions. The finger has an extended lower end face 202 substantially normal to the axis of the finger. A coiled compression spring 203 is fitted in circumscribing relation to the rod and provides opposite ends respectively connected to the mounting arm 180 and to the flange 193 for yieldably urging rotation of the mounting block 88 on the rod 192 in a counterclockwise direction, as viewed in Fig. 7.

Figure 13:
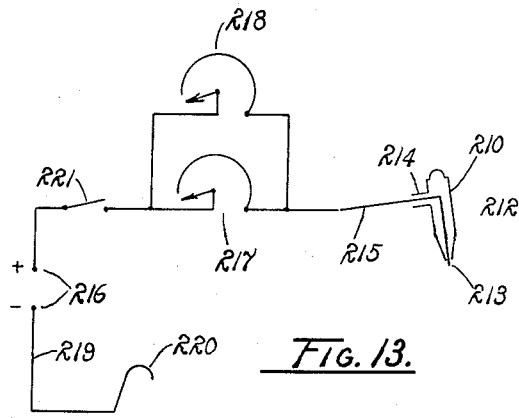
Fig. 13 is a schematic electrical circuit employed in the present invention.

An electrode holder 210 is fitted in the socket 192 of the mounting block 188 and provides a shank 211 extended in generally parallel relationship to the finger 200. An electrode 212, preferably of tungsten, is mounted in the holder and is axially adjustably extended through the shank and terminates in a tip 213 extended outwardly of the shank. A shielding gas supply hose 214 is connected to the holder for supplying gas to the shank and around the tip of the electrode during welding operations. An elongated cable 215 is extended through the hose having an end connected to the electrode and an opposite end connected to one pole of a source of voltage 216 for the electrode, as illustrated in Fig. 13. A main variable electrical resistance 217 is connected in series with the voltage source and the electrode. An auxiliary adjustable rheostat 218 is mounted on one of the legs 79 of the mounting bracket 75 and is connected in parallel with the variable resistance 217. An electrically conductive ground lead 219 is connected to the other pole of the source of voltage and has a ground hook 220 connected to its extended end. Further, an on-off switch 221 is connected in series circuit with the electrode, the parallel combination of the resistance and the rheostat, and the source of voltage.

Figure 10:
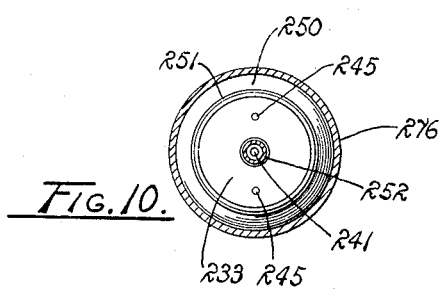
Fig. 10 is a fragmentary transverse section taken at a position represented by line 10—10 of Fig. 1.

With particular reference to Figs. 9 and 10, spaced primary and secondary packers 230 and 231 are shown. The packers have solid cores 232 and 233 of generally cylindrical form providing flat normal end faces and circumscribing cylindrical surfaces. The primary packer core has an elongated T-shaped inflating passage 234 having an inlet 235 in one end face, an outlet 236 opening in the cylindrical surface of the core, and an outlet 237 opening in the opposite end face of the core from the end face in which the inlet is located. The core 233 also has an L-shaped inflating passage 240 providing an inlet 241 in one end face and an outlet 242 opening in the cylindrical surface of the core. The cores also provide straight elongated shielding gas passageways 244 and 245 extended in parallel relation to the axis of the cores between their opposite end faces.

The packers 230 and 241 include resiliently flexible annular sleeves 250 circumscribing the cores to provide annular inflating chambers and having opposite ends secured in gas-tight relation to opposite ends of the cores by means of bands 251 circumscribing the sleeves and compressing the sleeves into annular grooves in the cores. An elongated flexible, air impervious tube 252 interconnects opposed end faces of the cores and provides gas communication between the outlet 237 of the inflating passage 234 and the inlet 241 of the inflating passage 240.

Figure 12:
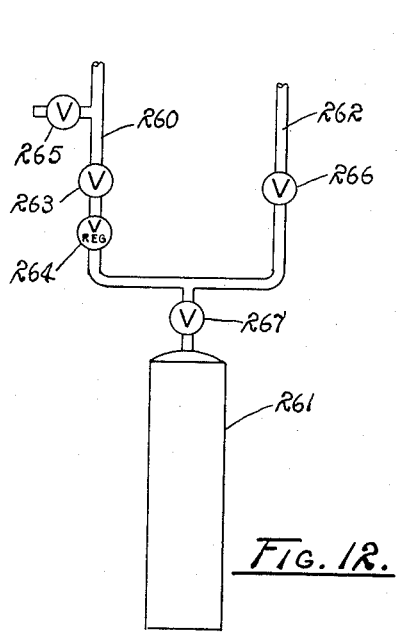
Fig. 12 is a fragmentary schematic diagram of a gas system employed in the present invention.

With additional reference to Fig. 12, an inflating gas conduit 260 has an end connected to the primary packer 230 in communication with the inlet 235 of the inflating passage 234 and an opposite end connected to a source of inflating gas 261 under pressure. A shielding gas conductor 262 has an end connected to the shielding gas passageway 244 in the primary core 232 and an opposite end also connected to the source of gas. Preferably an inert gas such as helium or argon is employed. An on-off valve 263, a pressure regulator 264, and a bleeding valve 265 are connected in series in the inflating gas conductor 260. An on-off valve 266 is also connected in series with the shielding gas conduit 262. A main control valve 267 is connected in the line leading directly to the gas source for controlling the flow to both the conduit 260 and the conductor 262. Although the welding apparatus described is of the permanent electrode, shielded arc type, it is to be understood that other types of welding devices could be mounted in the manner described equally as well.

*Operation*

The operation of the described embodiment of the subject invention is believed to be readily apparent and is briefly summarized at this point.

In order to insert a pipe 275 into the apparatus, the bolts 45 and 106 are loosened. Further, the clamp ring 170 is opened or at least unlatched. The pipe can then be slidably extended through the clamps 86 and 87, the open ring 170 and within the rollers 50. Thereupon, the bolts 45 are screw-threaded downwardly to position the pipe between the rollers for rotatable movement therewithin.

Further, the clamp ring 170 is closed and the latching nut 176 tightened so that jaws 171, 172 tightly frictionally engage the pipe 275 and connect it to the collar 111. By rotating the crank 142, the chain 136 is tightened. The motor 124 is started to rotate the drive shaft 132. The driven gear 114 is rotated thereby to rotate the pipe 275 relative to the rollers 50 and the clamps 86 and 87.

To cut the pipe 275, the saw 156 is pivoted on the rod 154 toward the pipe 275 to bring the abrasive disc 158 into engagement with the pipe. Prior to this, of course, the limit members 160 are adjusted to position the saw disc in the desired cutting plane longitudinally of the pipe. It will be evident that concurrent rotation of the pipe and the saw disc when the pipe and disc are in engagement will effect cutting of the pipe along the plane of the disc to provide two separate sections 276. When the pipe has been cut, the saw is retracted and the motor de-energized to stop rotation of the pipe. It is to be observed that the angle of the plane of the disc with respect to the pipe axis could be varied from the 90° relation shown, if desired, so as to cut along a bias.

If it is desired to weld the sections 276 of the pipe 275 together along their adjacent edges 277, the clamp ring 170 is unlatched and given a slight twist to separate the slots 177 from the studs 118. The ring is then slid longitudinally on the pipe 275 away from the collar 111, and, by opening the jaws 171, 172, it is removed from the pipe. The bolts 45 are loosened and the bolts 106 are tightened downwardly to clamp the sections of the pipe tightly within the adapter segments 105 with their adjacent edges in abutment or very closely spaced relation. The bolts 106 are individually adjusted to position the pipe sections in precise axial alignment. It is to be noted that the rollers need not exercise any clamping effect on the pipe. However, it is preferable that the adjacent edges be precisely complementary so that the edges can be in close abutted relation. For this purpose the pipes to be welded are cut in the manner above described to provide such mating edges.

Next, the pivot rod 182 is inserted in the mounting arm 180 and connected thereto by the nut 183. It is to be noted that the finger 200 and the electrode 212 extend in substantially radial relation to the pipe 275. The end face 202 of the finger substantially complementarily rests on one of the pipe sections 276 in adjacent spaced relation to the end edges to be welded. The lock-nut 201 is loosened, if necessary, and the finger longitudinally adjusted relative to the flange 193 to position the end of the shank 211 in properly spaced relation to the pipe. The electrode 212 is positioned in the precise plane defined by the weld line or space between the adjacent edges of the pipe sections by adjusting and tightening the set-screws 196. Preferably, the electrode is positioned at aproximately one-eighth of an inch from the pipe sections although this may vary with welding conditions. It is to be noted that the springs 203 yieldably maintain the finger 200 in contact with the pipe section and thus maintains the electrode tip in the designated spaced relation to the pipes.

Next the chain 136 is loosened by turning the crank 142. The collar 111 is then manually turned to rotate the electrode 212 around the pipe 275 in the opposite direction of rotation to that normally resulting from rotation of the collar by the drive shaft 132. This is done to give the hose 214 an advance turn prior to beginning the welding operation. The chain is, of course, thereafter tightened.

The packers 230 and 231 in deflated condition are then inserted in an open end of the pipe 275 and positioned on opposite sides of the edges 277 to be welded, as shown in Fig. 9. The pressure regulator 264 is then adjusted for the predetermined inflating pressure of the packers, and the on-off valves 263, 266 and 267 are opened. This releases gas for passage under pressure through the conduits 260 and 262 to expand or inflate the sleeves 250 into gas-tight relation with the pipe sections 276. Passage of gas through the passages 244 and 245 initially exhausts the air from the space between the inflated packers and thereafter maintains this space full of gas around the weld line.

The rheostat 218 and the resistance 217 are then adjusted to provide the designated current for the welding operation. The ground hook 220 is then rested on the pipe in electrical contact therewith. The welder voltage 216 is turned on by means of the switch 221. An arc is then struck and almost simultaneously so as not to burn a hole in the pipe, the motor 124 is energized. This causes the electrode 212 to travel slowly around the pipe 275 and to weld the adjacent edges 277 of the pipe sections together. Preferably, the speed of rotation of the electrode is approximately one-half to one revolution per minute. This is not precisely critical and may be varied, as required. As the electrode approaches the end of the welded seam, the rheostat is manually adjusted to increase the resistance and gradually to reduce the current to zero as the electrode reaches the end of the seam.

When the pipe sections 276 have been welded in the manner described, the motor 124 and the switch 221 are turned off. The bleeding valve 265 is opened to release the gas from the packers 230 and 231 after the valves 263, 266 and 267 are turned off. Thereupon the packers are removed from the pipe. By loosening the bolts 106, the pipe 275, now in one piece, can be removed from the clamps.

The bracket 75 is illustrated for bench use in the drawings but is especially advantageous for use in welding pipe sections 276 in situ, that is, already installed as stationary parts of a piping system, not shown. For this purpose the bolts 78 are removed to separate the bracket from the beam 58. The clamps 86 and 87 are connected to the pipe sections in the same manner as previously described except that the upper and lower clamp sections 88, 89, 90 and 91 and the segments 105 are separated, fitted around, and reassembled in circumscribing clamping relation to the pipe sections. However, it is preferable that the web 76 depend from the pipe to prevent the bracket from twisting on the pipe sections. The clamps of course maintain the pipe sections in precise axial alignment. The apparatus is adjusted and operated as before.

In some instances it may be necessary to weld an elbow, not shown, to a straight section of pipe. In such case, the straight section only is held in the clamp 87 and the abutting edge of the elbow preliminarily is tacked to the straight section since it is not capable of being clamped properly in either of the clamps 87 or 88. Thereafter a continuous weld is effected in the same manner as above described.

Clearly other tools, such as cutting torches and blades, can be substituted for the welding electrode, and other workpieces can be substituted for the pipe within the teachings of the subject invention.

Further, the pipe sections 276 can be blocked off to gas passage by balloons, not shown, in each adjacent end of the pipe sections, if difficulty were experienced in slidably threading the packers 230 and 231 into the pipe. If so, a cup is mounted on the block 188 for covering relationship over the space between adjacent ends of the pipe sections and having connection to the conduit 262. The cup is mounted in advance of the electorde circumferentially in the direction of rotation of the block so as to deliver gas to the compartment between the balloons prior to movement of the electrode thereover. After the welded seam has been completed, the pipe sections directly outside of the balloons are touched with the hot electrode to burst the balloons and effect their easy removal simply by flushing out the pipes.

Practical working embodiments of the subject invention have performed remarkably well. The welds are continuous and smooth and are lacking in flaws. These results are in large measure due to the mounting of an electrode for circuituous travel circumferentially of a pipe at a slow relatively uniform speed. The fact that the device can weld pipe in situ imparts additional versatility to the device not believed previously to have been known.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An apparatus for joining a pair of tubular members in end-to-end relation comprising a bracket including a pair of spaced axially aligned annular longitudinally split clamps having releasably interconnected portions adapted to be individually releasably laterally fitted in rigid circumscribing relation on the tubular members so as to maintain the tubular members in precise axial alignment and in closely adjacent end-to-end relation, the bracket further including a U-shaped web rigidly interconnecting the clamps and having a central portion in laterally outwardly spaced relation to the clamps, an annular collar adapted to circumscribe one of the tubular members and having releasably interconnected portions rotatably mounted on one of the clamps for rotation circumferentially of said tubular member, rotary drive means mounted on the central portion of the web, means interconnecting the drive means and the collar for rotating the collar incident to energization of the drive means, and a welding device mounted on the collar for rotation therewith and adapted to be positioned in adjacent spaced relation to the adjacent ends of the tubular members so as to travel circumferentially of the tubular members incident to collar rotation and to weld the adjacent ends of the tubular members together, the central portion of the web being spaced outwardly of the welding device to facilitate free rotation of the welding device around the tubular members.

2. An automatic welding apparatus adapted to weld the adjacent ends of a pair of pipes together, comprising a substantially U-shaped bracket including a pair of axially spaced, axially aligned clamps individually circumscribing bores individually releasably adapted to receive the pipes to be welded in fitted frictionally tight relation therewithin with adjacent ends of the pipes between the clamps, legs individually rigidly laterally extended from the clamps in axially spaced relation to each other, and a central mounting platform rigidly interconnecting the legs in laterally outwardly spaced relation to the clamps, the bracket being thereby adapted to be rigidly supported on such pipes; an annular driven member positioned between the clamps and rotatably mounted on one of the clamps in axial alignment with the clamps for rotatable movement circumferentially of said one pipe; a welding electrode; means mounting the electrode on the driven member so as to be in adjacent spaced relation to the adjacent ends of the pipes for movement circumferentially of the pipes with the driven member to enable welding said ends of the pipes together; and powered means mounted on the platform in laterally spaced relation to the driven member having driving connection to the driven member for imparting rotation thereto.

3. In combination with a support and a pair of cylindrical stainless steel pipes of uniform diameter borne by the support and having inwardly disposed ends; an apparatus for welding the adjacent ends of the pipes together by providing a continuous welded seam circumferentially of the pipes comprising a U-shaped bracket including a pair of spaced cylindrical axially aligned clamps releasably individually clamped on the pipes with said pipe ends therebetween, legs individually rigidly radially outwardly extended from the clamps, and a central portion interconnecting the legs, the clamps holding the pipes in precise axial alignment and with their inwardly adjacent ends in closely adjacent spaced relation, one of the clamps having an annular recess disposed toward the other clamp; an annular collar releasably rotatably journaled in said recess, concentrically circumscribing the pipe, and including an annular gear concentrically circumscribing the pipe; a mounting arm rigidly secured to the collar and substantially radially outwardly extended therefrom; a pivot rod rigidly secured to the mounting arm and outwardly extended therefrom in spaced substantially parallel relation to the pipes; an electrode mounting block rotatably fitted on the rod; a flange secured to the block and extended therefrom laterally of the rod; an elongated electrode positioning finger longitudinally adjustably mounted in the flange in substantially radial relation to the pipe and having an inner end slidably engaging one of the pipes adjacent to said adjacent ends; a spring mounted on the rod engaging the flange and yieldably urging the finger into pipe engagement; an elongated welding electrode mounted in the block in radial relation to the pipes, in a plane transversely of the pipes coincident with the plane of the space between the adjacent ends of the pipes, and having an inner tip in closely adjacent spaced relation to the adjacent ends of the pipes; a motor mounted on the central portion of the bracket having an output shaft; a gear reduction mechanism having an input shaft driven by the output shaft of the motor and a drive shaft substantially parallel to the pipes adapted to rotate slowly at a uniform speed; a drive sprocket mounted on the drive shaft and coplanar with the gear; and an elongated endless chain extended around the sprocket and the gear and in mesh therewith for rotating the collar upon motor energization, the electrode tip being thus movable circumferentially of the pipes concentrically thereof and in precisely equally spaced relation to the pipes throughout said circumferential movement.

4. An apparatus for mounting a work tool in predetermined position in relation to an elongated tubular wall means, the combination of a bracket including a pair of spaced axially aligned annular longitudinally-split clamps having a releasably interconnected portion adapted to be individually releasably laterally fitted in rigid circumscribing relation on the wall means so that the clamps are in longitudinally spaced relation along the wall means, the bracket further including a U-shaped web rigidly interconnecting the clamps and having a central portion in laterally outwardly spaced relation to the clamps; an annular collar adapted to circumscribe the wall means, and having releasably interconnected portions rotatably mounted on one of the clamps and between the clamps for rotation circumferentially of said wall means; rotary drive means mounted on the central portion of the web; means interconnecting the drive means and the collar for rotating the collar incident to energization of the drive means; and a work tool mounted on the collar for rotation therewith between the clamps so as to travel circumferentially of the wall means incident to collar rotation, the central portion of the web being spaced outwardly of the work tool to facilitate observation and free rotation of the work tool around the wall means.

5. An automatic welding apparatus adapted to weld the adjacent ends of a pair of pipes together comprising a substantially U-shaped bracket including a pair of axially spaced, axially aligned tubular clamps providing axially aligned bores individually releasably adapted to receive the pipes to be welded in fitted frictionally tight relation therewithin with the adjacent ends of the pipes between the clamps, legs individually rigidly laterally extended from the clamps in axially spaced relation to each other, and a central mounting platform rigidly interconnecting the legs in laterally outwardly spaced relation to the clamps; an annular driven member positioned between the clamps and rotatably mounted on one of the clamps in axial alignment with the clamps for rotatable movement circumferentially of the pipe fitted in said one clamp; a mounting arm rigidly secured to the driven member and substantially radially outwardly extended therefrom; a rod rigidly secured to the mounting arm and extended toward the other clamp from said one clamp in spaced substantially parallel relation to the axis of the clamps; an electrode mounting block rotatably fitted on the rod and adapted to mount a welding electrode in substantially radial relation to the pipes; a flange secured to the block and extended therefrom laterally of the rod; an elongated electrode positioning finger mounted in the flange in substantially radial relation to the axis of the clamps and having an inner end adapted for slidable engagement with one of the pipes adjacent to the ends to be welded; means connected to the flange for yieldably urging the finger into pipe engagement; and powered means mounted on the platform in laterally spaced relation to the driven member having driving connection to the driven member for imparting rotation thereto.

6. The apparatus of claim 2 wherein each of the clamps includes a plurality of outer sections releasably interconnected in circumscribing relation to its respective bore for enabling lateral attachment and release to and from its respective pipe.

7. The apparatus of claim 6 wherein each of the clamps further includes a plurality of inner adapter segments releasably assembled in annular relation when each of the fitted outer sections of the clamps are in circumscribing relation to their respective bores, the segments being adapted for direct engagement with their respective pipes, and a plurality of adjusting bolts substantially radially inwardly screw-threadably extended through the outer sections and engaging the segments for radial adjustment of the segments inwardly and outwardly relative to the pipes therewithin thereby tightly to clamp the pipes in rigid axial relation.

8. The apparatus of claim 2 wherein the legs are flat and in a substantially common plane radially related to the clamps, each clamp including a lower semi-cylindrical outer section connected to its respective leg and an upper outer semi-cylindrical outer section releasably complementarily connected to its associated lower section in circumscribing relation to said bores.

9. The apparatus of claim 2 wherein one of the clamps has an annular bearing recess disposed toward the other clamp and in circumscribing relation to the pipe on which said one clamp is fitted; and wherein said driven member includes a plurality of separable sections releasably interconnected in annular relation and rotatably journaled in the recess.

10. The apparatus of claim 2 wherein a panel is mounted on the platform for adjustable movement toward and away from the clamps, said powered means being carried by the panel, the driving connection including an endless member extended around the driven member and adapted to be loosened and tightened incident to said adjustment of the panel on the platform, and including means engaging the panel and the platform for adjusting the panel on the platform.

11. An apparatus for mounting a work tool for travel in a circuitous path circumferentially of an elongated tubular workpiece having an axis of reference comprising a clamp adapted to be connected to the workpiece, an annular driven member rotatably mounted on the clamp in circumscribing relation to said axis of reference, powered means having driving connection to the driven member for imparting rotary movement thereto around said axis, means mounting the powered means on the clamp, a mounting arm rigidly connected to the driven member and substantially radially outwardly extended therefrom, a pivot rod rigidly secured to the mounting arm and extended outwardly therefrom in substantially parallel relation to said axis and adapted to be in laterally spaced relation to such a workpiece on which the clamp is mounted, a work tool mounting block rotatably journaled on the rod, a flange secured to the block and extended laterally of the rod, a work tool positioning finger mounted in the flange in substantially radial relation to said axis and having an inner end adapted for slidable engagement with the workpiece, and means connected to the flange for yieldably urging the finger into workpiece engagement, said mounting block being adapted to mount a work tool in a position adjacent to the workpiece, and said finger being adapted to maintain the work tool in predetermined spaced relation to the workpiece during rotation of the driven member and thus the work tool circumferentially of the workpiece.

12. The apparatus of claim 11 wherein the rod is connected to the arm for adjustment radially inwardly and outwardly of the clamp, wherein the finger is longitudinally radially adjustably mounted in the flange; and wherein the yieldable means is a spring having an end connected to the arm, an intermediate coiled portion circumscribing the rod, and an opposite end connected to the flange for urging the block to pivot in a predetermined direction around the rod and thereby to urge the finger into engagement with the workpiece held in the clamp.

13. An apparatus for welding the ends of a pair of pipes together comprising a U-shaped bracket including first and second spaced tubular axially aligned clamps adapted to be releasably individually clamped on the pipes with said pipe ends therebetween, legs individually rigidly radially outwardly extended from the clamps, and a central portion interconnecting the legs, the clamps being adapted to hold the pipes in precise axial alignment with their ends in adjacent relation, a first one of the clamps having an annular recess disposed toward the second clamp adapted to circumscribe the pipe therewithin; an annular collar releasably rotatably journaled in said recess for rotation about a predetermined axis extended longitudinally within the pipes and including an annular gear; a mounting arm rigidly secured to the collar and substantially radially outwardly extended therefrom; a rod rigidly secured to the mounting arm and extended toward said second clamp in spaced substantially parallel relation to said predetermined axis; an electrode mounting block rotatably fitted on the rod; a flange secured to the block and extended therefrom laterally of the rod; an elongated electrode positioning finger longitudinally adjustably mounted in the flange in substantially radial relation to said predetermined axis and having an inner end adapted for slidable engagement with one of the pipes adjacent to said pipe ends; means connected to the flange for yieldably urging the finger into pipe engagement; an elongated welding electrode mounted in the block in substantially radial relation to said axis, adapted to be in a plane transversely of the pipes coincident with the plane of the adjacent ends of the pipes, and having an inner tip adapted to be positioned by the finger in closely adjacent spaced relation to the adjacent ends of the pipes; a motor mounted on the central portion of the bracket having an output shaft; a drive sprocket; means coupling the drive sprocket to the output shaft; and an elongated endless chain extended around the sprocket and the gear and in mesh therewith for rotating the collar upon motor energization, the electrode tip being thus movable circumferentially of the pipes and being maintained in precisely equally spaced relation to the pipes by the finger throughout said circumferential movement.

14. An apparatus for mounting a work tool for movement about a workpiece having an outer surface of revolution circumscribing a predetermined axis comprising a U-shaped bracket including first and second spaced tubular axially aligned clamps adapted to be releasably individually clamped on the workpiece, legs individually rigidly radially outwardly extended from the clamps, and a central portion interconnecting the legs, said first clamp having an annular recess disposed toward the second clamp adapted to circumscribe said predetermined axis; an annular collar releasably rotatably journaled in said recess for rotation about said predetermined axis and including an annular gear; a mounting arm rigidly secured to the collar and substantially radially outwardly extended therefrom; a rod rigidly secured to the mounting arm and extended toward said second clamp in spaced substantially parallel relation to said predetermined axis; a work tool mounting block rotatably fitted on the rod; a flange secured to the block and extended therefrom laterally of the rod; an elongated work tool positioning finger longitudinally adjustably mounted in the flange in substantially radial relation to said predetermined axis and having an inner end adapted for slidable engagement with said surface of the workpiece; means connected to the flange for yieldably urging the finger into workpiece engagement; an elongated work tool mounted in the block in substantially radial relation to said axis, and having an inner end adapted to be positioned by the finger in closely adjacent spaced relation to the surface of the workpiece; a motor mounted on the central portion of the bracket having an output shaft; a drive sprocket coupled to the output shaft; and an elongated endless chain extended around the sprocket and the gear and in mesh therewith for rotating the collar upon motor energization, the work tool end being thus movable circumferentially of the workpiece and being maintained in precisely equally spaced relation to its surface by the finger throughout said circumferential movement.

15. A bracket for supporting a work tool and control means therefor on a workpiece comprising a central mounting platform, legs rigidly extended in the same direction from the platform in a substantially common plane with and in spaced substantially parallel relation to each other, the legs terminating in endwardly extended upper flanges and adjacent recesses, the bracket further including a pair of axially aligned, axially spaced tubular clamps individually adapted to receive the workpiece and including upper and lower sections releasably interconnected in tubular formation, the lower sections providing lower flanges individually fitted in the recesses of the legs against the upper flanges thereof, and means releasably interconnecting the respectively interfitted flanges, one of the clamps being adapted to mount a work tool thereon and said platform being adapted to support control means for the tool.

16. The bracket of claim 15 wherein bolts are upwardly extended from the lower flanges of the lower sections of the clamps, wherein the upper sections have upper flanges respectively overlaying their adjacent lower flanges and individually forming extensions of the upper flanges of the legs, the upper flanges of the upper sections having notches respectively fitted over their adjacent bolts, wherein the upper and lower sections have mating latching flanges extended from the clamps in the opposite direction from their upper and lower flanges, and wherein the bracket includes means releasably interconnecting said mating flanges.

References Cited in the file of this patent

UNITED STATES PATENTS

| | | |
|---|---|---|
| 1,775,311 | Halle | Sept. 9, 1930 |
| 2,013,630 | Goldsborough | Sept. 3, 1935 |
| 2,227,194 | Moise et al. | Dec. 31, 1940 |
| 2,350,716 | Bissont et al. | June 6, 1944 |
| 2,459,047 | Scharf | Jan. 11, 1949 |
| 2,654,014 | Schaefer | Sept. 29, 1953 |
| 2,721,248 | Kirkpatrick | Oct. 18, 1955 |
| 2,791,823 | Espari et al. | May 14, 1957 |
| 2,795,689 | McNutt | June 11, 1957 |
| 2,802,092 | Hauck | Aug. 6, 1957 |
| 2,810,187 | Klein | Oct. 22, 1957 |
| 2,817,745 | Pelia | Dec. 24, 1957 |